United States Patent
Liao et al.

(10) Patent No.: US 7,348,744 B2
(45) Date of Patent: Mar. 25, 2008

(54) BRUSHLESS DC MOTOR DRIVE APPARATUS

(75) Inventors: Chih-Lun Liao, Taoyuan Hsien (TW); Lee-Long Chen, Taoyuan Hsien (TW); Yueh-Lung Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 50 days.

(21) Appl. No.: 11/295,509

(22) Filed: Dec. 7, 2005

(65) Prior Publication Data

US 2006/0164767 A1    Jul. 27, 2006

(30) Foreign Application Priority Data

Jan. 27, 2005    (TW) .............................. 94102462 A

(51) Int. Cl.
*H02P 6/18* (2006.01)
*H02H 7/08* (2006.01)

(52) U.S. Cl. ...................... 318/434; 318/430; 318/254; 318/721; 318/724; 361/30

(58) Field of Classification Search ................ 318/138, 318/254, 430–434, 439, 720–724; 388/903; 361/23, 30, 31, 33
See application file for complete search history.

(56) References Cited

U.S. PATENT DOCUMENTS

| | | | | |
|---|---|---|---|---|
| 4,097,788 A * | 6/1978 | Nygaard et al. | ............ | 318/271 |
| 4,492,526 A * | 1/1985 | Hartwig et al. | ............... | 417/45 |
| 4,591,768 A * | 5/1986 | Kudelski | ..................... | 388/820 |
| 4,641,066 A * | 2/1987 | Nagata et al. | ............. | 318/254 |
| 5,134,349 A * | 7/1992 | Kruse | ......................... | 318/254 |
| 5,223,772 A * | 6/1993 | Carobolante | ................ | 318/254 |
| 5,317,244 A * | 5/1994 | Ishikura | ...................... | 318/254 |
| 5,703,449 A * | 12/1997 | Nagate et al. | ............. | 318/254 |
| 5,845,045 A * | 12/1998 | Jeske et al. | ................. | 388/804 |
| 5,929,589 A * | 7/1999 | Suzuki et al. | ............... | 318/685 |
| 6,023,139 A * | 2/2000 | Chin | ........................... | 318/434 |
| 6,611,117 B1* | 8/2003 | Hardt | .......................... | 318/254 |
| 6,741,047 B2* | 5/2004 | Horng et al. | ................ | 318/254 |
| 7,042,180 B2* | 5/2006 | Terry et al. | .................. | 318/434 |

* cited by examiner

*Primary Examiner*—Bentsu Ro
(74) *Attorney, Agent, or Firm*—Birch, Stewart, Kolasch & Birch, LLP

(57) ABSTRACT

A brushless DC motor drive apparatus for driving a rotor includes a drive circuit rotating the rotor, a current shutdown and auto-restart circuit coupled to the drive circuit, and a DC voltage comparison circuit coupled to the current shutdown and auto-restart circuit. The current shutdown and auto-restart circuit detects blockage of the rotor via the DC voltage comparison circuit and shuts off the power to the drive circuit accordingly.

18 Claims, 5 Drawing Sheets

BRUSHLESS DC MOTOR DRIVE APPARATUS

CROSS REFERENCE

This Non-provisional application claims priority under U.S.C.§ 119(a) on Patent Application No(s). 094102462 filed in Taiwan, Republic of China on Jan. 27, 2005, the entire contents of which are hereby incorporated by reference.

BACKGROUND

The disclosure relates in general to a brushless DC motor drive apparatus. In particular, the present disclosure relates to a brushless DC motor drive apparatus without Hall sensor, and providing functions of automatic power shutoff and restoration.

Among electronic device, it is common to include a cooling fan, to prevent overheating and resulting burnout. Upon overheating, the fan is normally initialized to lower the temperature, and dissipate excess heat from the system.

Conventionally, the fan is driven by a motor. A brushless DC motor (BLDC) is conventionally utilized, owing to easy maintenance, good controllability, and efficient performance. Not only in low power applications such as motors in hard drives and compact disk (CD) drives, but also in high power applications such as the motor apparatus in electric cars, brushless DC motors provide advantages such as high efficiency, stable rotation, high torsion, endurance, and easy maintenance.

FIG. 1 shows a circuit schematic of a conventional brushless DC motor driver, in which a drive circuit 100 of brushless DC motor includes a first winding L1, a second winding L2, a capacitor C1, transistors Q1, Q2, Q3, Zener diodes ZD1, ZD2, ZD3, and resistors R1, R2, R3. The first winding L1 may be a supplementary winding, and the second winding L2 may be a power winding, both of which magnetically excite and drive the rotor to rotate, via the switching operation and alternated current directions of the drive circuit 100.

First State

When a constant voltage source provides a current, the voltage potential at node "a" is high, and the voltage potential at node "b" is relatively low, across both ends of the first winding L1 simultaneously. Low voltage potential results at the base of the transistor Q2, subsequently switched off, such that no current flows through the first winding L1.

Concurrently, the base of the transistor Q3 is at a high voltage potential, such that the transistor Q3 becomes conductive, a current passes through the transistor Q3 from the second winding L2 to ground. The second winding L2 exerts control over a stator generating an induced magnetic field so as to drive the rotor to rotate at a predetermined angle via the induced magnetic field. For example, rotating 90° counter-clockwise.

Second State

When the rotor reaches the predetermined angle, the first winding L1 detects a state of power generation, and correspondingly generates a reverse inductive signal (e.g., reverse voltage), so that the voltage potential at node "a" is low, and the voltage potential at node "b" is relatively high. Positive voltage is applied to the base of the transistor Q2, in turn switching the transistor Q2 on current through the resistor R2 and the transistor Q2 to ground. Thus, the base of the transistor Q3 is brought to a low voltage potential, and the transistor Q3 is switched off, such that there is no current through second winding L2. Though no magnetic field is induced across the stator the rotor continues rotating in the same direction, returning to the first operating condition subsequently, alternating between operating conditions.

However, the above-mentioned conventional drive circuit has several problems to resolve. When the fan is blocked by a foreign object such as an obstacle, the rotor is stopped immediately. In the absence of tangential magnetic force, the first winding L1 becomes inactive. As the result, the transistor Q2 remains off, with no current through the first winding L1. Because the conventional drive circuit does not have the function of cutting the power when the fan is blocked, a continuous current is provided through the second winding L2 and the transistor Q3 to ground. Heat generated at second winding L2 causes possible damage to the brushless DC motor and the entire system.

In addition, the conventional circuit cannot spontaneously restart the circuit operation to drive the rotor even if the obstacle is removed. To restore circuit operation, it is necessary to disconnect the power supply then reconnect the brushless DC motor, which presents considerable inconvenience.

SUMMARY

Accordingly, an embodiment of the invention provides a brushless DC motor drive apparatus including a drive circuit, a current shutdown and auto-restart circuit, and a DC voltage comparison circuit. The drive circuit functions as rotating the rotor. The current shutdown and auto-restart circuit is coupled to the drive circuit, and the DC voltage comparison circuit is coupled to the current shutdown and auto-restart circuit. The current shutdown and auto-restart circuit detects blockage of the rotor via the DC voltage comparison circuit, and shuts off a power to the drive circuit accordingly.

The drive circuit includes a first winding, a second winding, a first transistor, and a second transistor. When the drive circuit is powered on and the second transistor is switched off, no current is generated through the first winding, the first transistor becomes conductive, and the first transistor to the ground, such that a magnetic field is induced to drive the rotor to rotate at a predetermined angle. After the rotor is rotated, the first winding generates a voltage, and the second transistor is conductive, the first transistor is switched off, and there is no current is generated through the second winding, whereby the rotor is driven to rotate by the first winding and the second winding which are subjected to a switching operation and alternated current directions of the drive circuit.

The current shutdown and auto-restart circuit further includes a drive IC, and is coupled to the DC voltage comparison circuit. A signal output from the DC voltage comparison circuit is compared in the drive IC, and then the drive IC output another signal to determine the state of the current shutdown and auto-restart circuit. When the rotor rotates normally, the current shutdown and auto-restart circuit does not affect the drive circuit, but the current shutdown and auto-restart circuit shuts off a power to the drive circuit, only in the event blockage of the rotor via the DC voltage comparison circuit.

Further, the current shutdown and auto-restart circuit further includes a third transistor, imposing no effect on the drive circuit when off, and turning on to shut off the power to the drive circuit, when first transistor is off, and no current is generated through the second winding.

Furthermore, the current shutdown and auto-restart circuit further includes a fourth transistor. The drive IC outputs a signal to determine the conduction of the fourth transistor. The fourth transistor is switched off to turn on the third transistor, whereby power to the drive circuit is shut off, and the fourth transistor is switched on to turn off the third transistor, with the power to the drive circuit is on. Also, the current shutdown and auto-restart circuit further includes a capacitor, providing voltage to turn on the fourth transistor when power to the drive circuit is shut off, to enable the drive circuit to rotate the rotor.

BRIEF DESCRIPTION OF THE DRAWINGS

The invention will become more fully understood from the detailed description, given herein below, and the accompanying drawings. The drawings and description are provided for purposes of illustration only and, thus, are not intended to be limiting of the present invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in to art from this detailed description.

DETAILED DESCRIPTION

Figure 1:
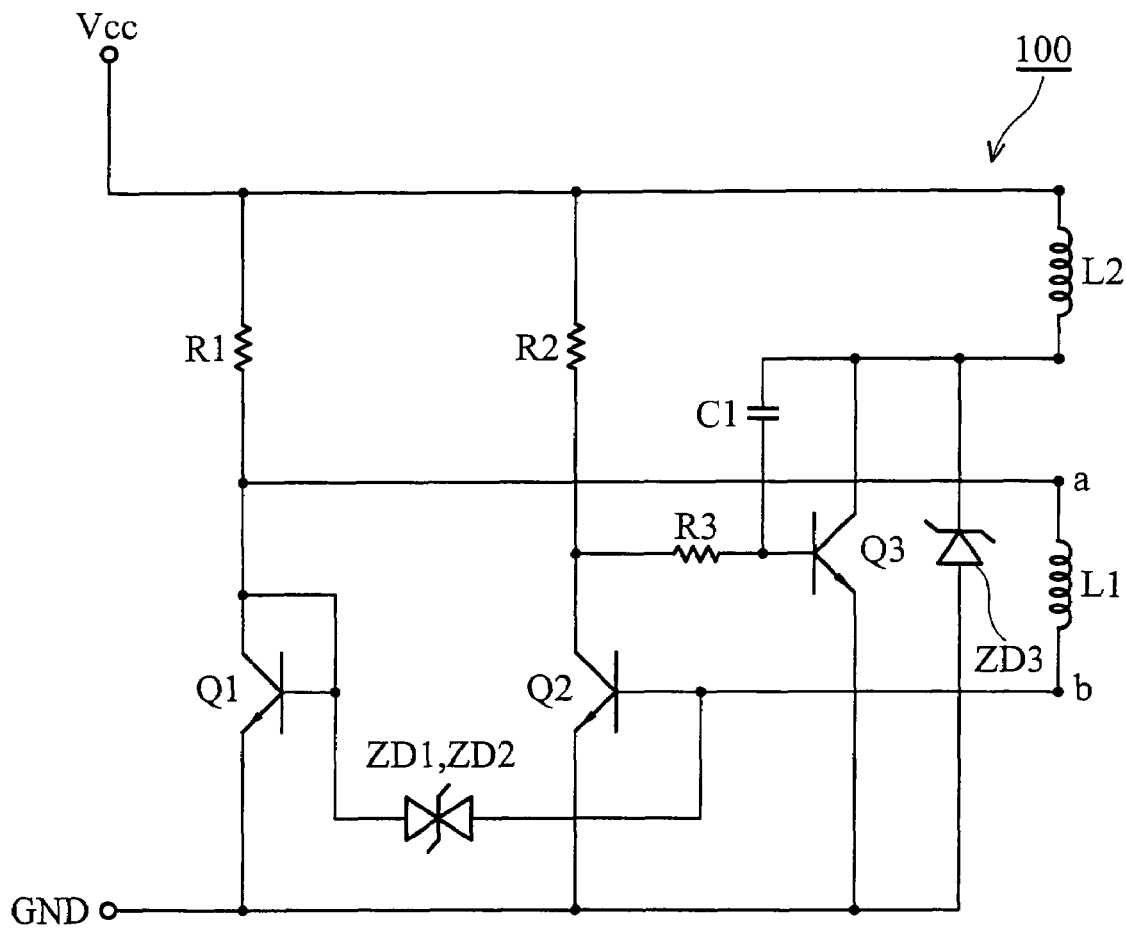
FIG. 1 is a schematic diagram of a conventional brushless DC motor drive apparatus without a Hall sensor.
Figure 2A:
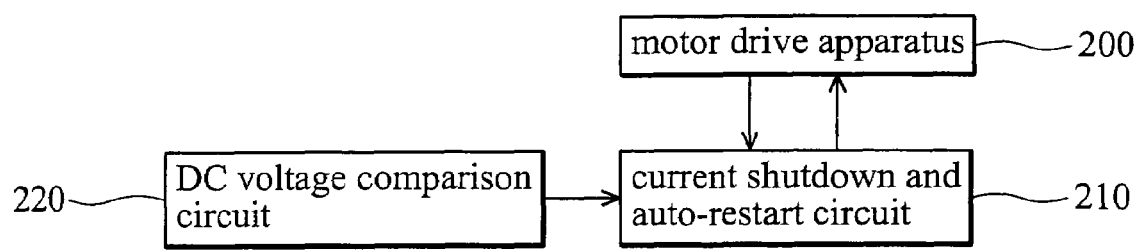
FIG. 2A is a block diagram of a brushless DC motor drive apparatus without a Hall sensor, as an embodiment in the present invention.

FIG. 2A is a block diagram of a brushless DC motor drive apparatus of an embodiment in the present invention, including a current shutdown and auto-restart circuit 210, and a DC voltage comparison circuit 220. The current shutdown and auto-restart circuit 210 is electrically connected to the brushless DC motor drive apparatus 200. Under normal operation, the brushless DC motor drive apparatus 200 drives the rotor of the motor magnetically. When the rotor is blocked by an obstacle and brought to a stop, the current shutdown and auto-restart circuit 210 recognizes the abnormal condition via the DC voltage comparison circuit 220, and accordingly outputs a signal to the brushless DC motor drive apparatus 200 for a power shutoff. As the result, the active components and the windings in the brushless DC motor drive apparatus 200 are thus safeguarded from overheating and burnout. Further, Upon removal of the blockage, the current shutdown and auto-restart circuit 210 spontaneously triggers the brushless DC motor drive apparatus 200 to resume normal operation.

Figure 2B:
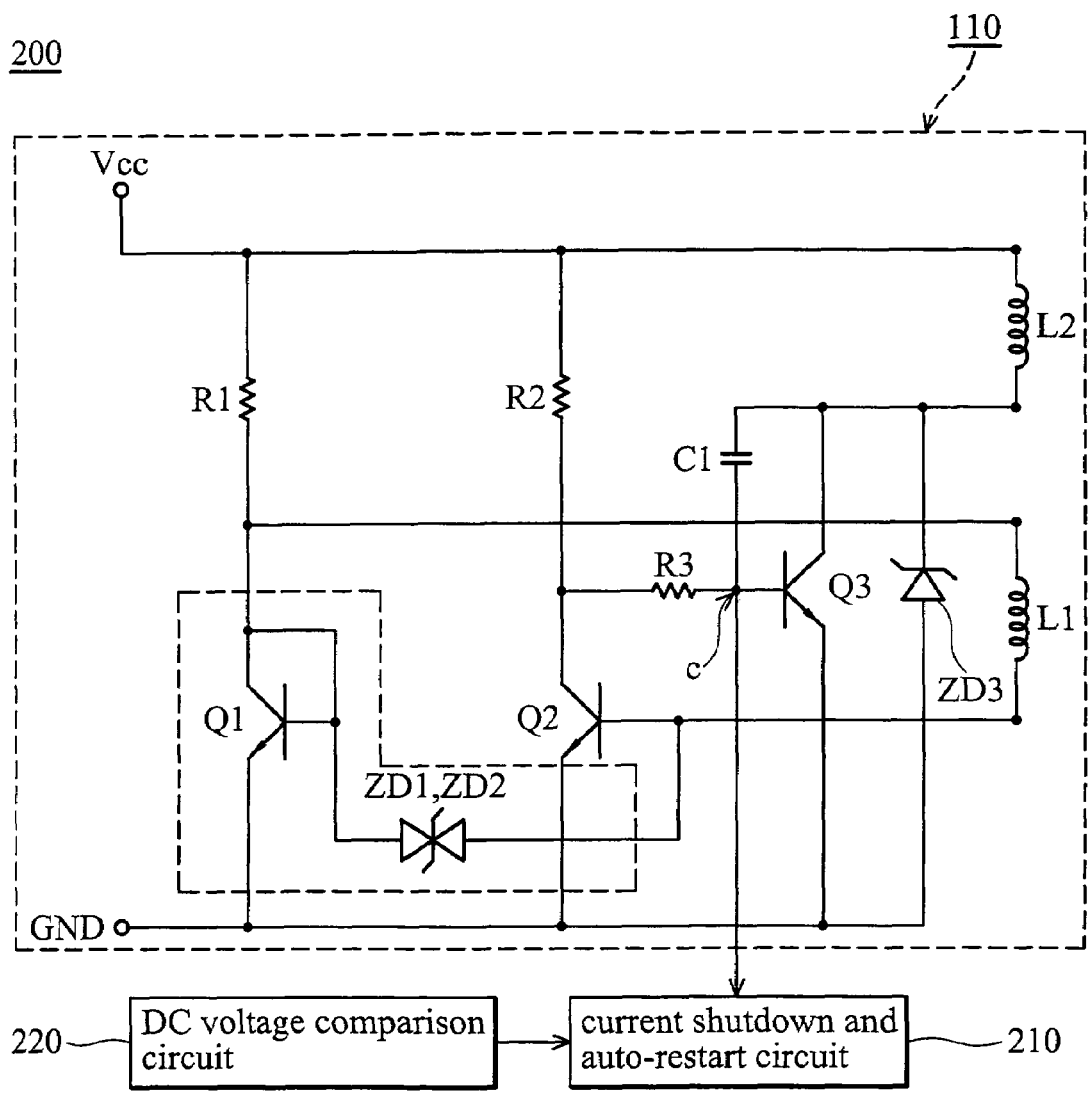
FIG. 2B and FIG. 2C are circuit schematic diagrams of brushless DC motor drive apparatus without a Hall sensor, as an embodiment in the present invention.
Figure 2C:
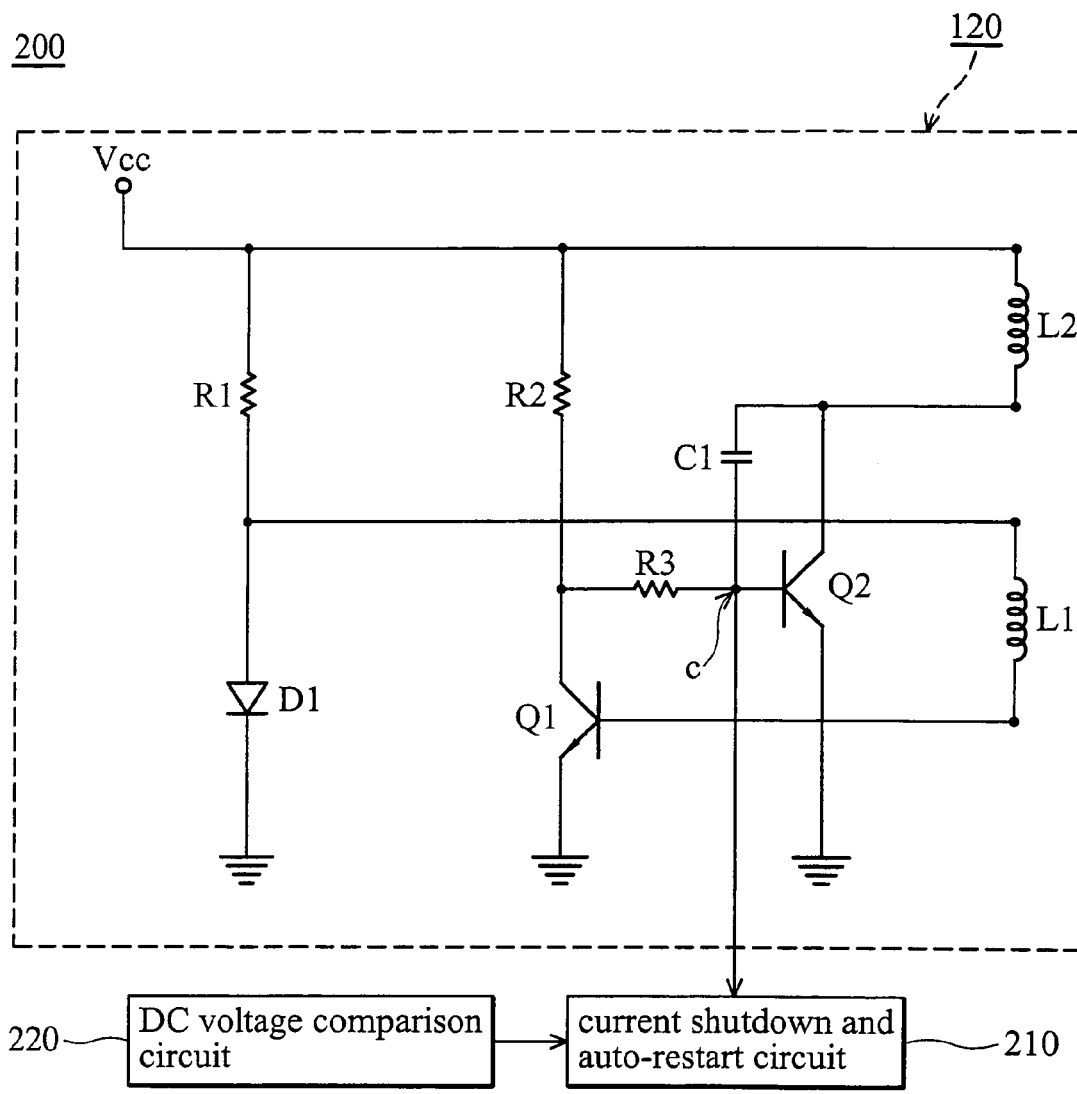

FIG. 2B and FIG. 2C are schematic diagrams of a brushless DC motor drive apparatus according to another embodiment in the present invention. As shown in FIG. 2B, a brushless DC motor drive apparatus 200, includes a drive circuit 110, a current shutdown and auto-restart circuit 210, and a DC voltage comparison circuit 220. The drive circuit 110 may drive circuit as in conventional application, incorporate two windings for switching operation, driving a rot-or of the motor magnetically. The Current shutdown and auto-restart circuit 210 and the DC voltage comparison circuit 220 are included in conjunction with the drive circuit 110, whereby providing the function of automatic power shutoff and restoration. The current shutdown and auto-restart circuit 210 is electrically coupled to the drive circuit 110 at a node "c", so as to control connection and disconnection of power to the brushless DC motor drive apparatus 200.

The implementation of the brushless DC motor drive apparatus 200 in embodiments of the present invention is not restricted to the drive circuit 110 in FIG. 2B. For example, the transistor Q1, and the Zener diodes ZD1 and ZD2 in the drive circuit 110 may alternatively be replaced with a single diode D1, whereby providing a constant bias voltage. The replacement may be demonstrated as the drive circuit 120 in FIG. 2C. Furthermore, the resistors R1, R2, R3 are exercised in drive circuits 110 and 120 for voltage division, whereby achieving a desirable voltage in the drive circuit. Additionally, the number of the capacitor C1 is not limited to one, the drive circuits 110, 120 may includes multiple capacitors connected in series. This configuration presents more design flexibility, rendering capacitance easily adjustable to meet the specific requirements of the user, rather than employing a single capacitor with particular capacitance.

Figure 3:
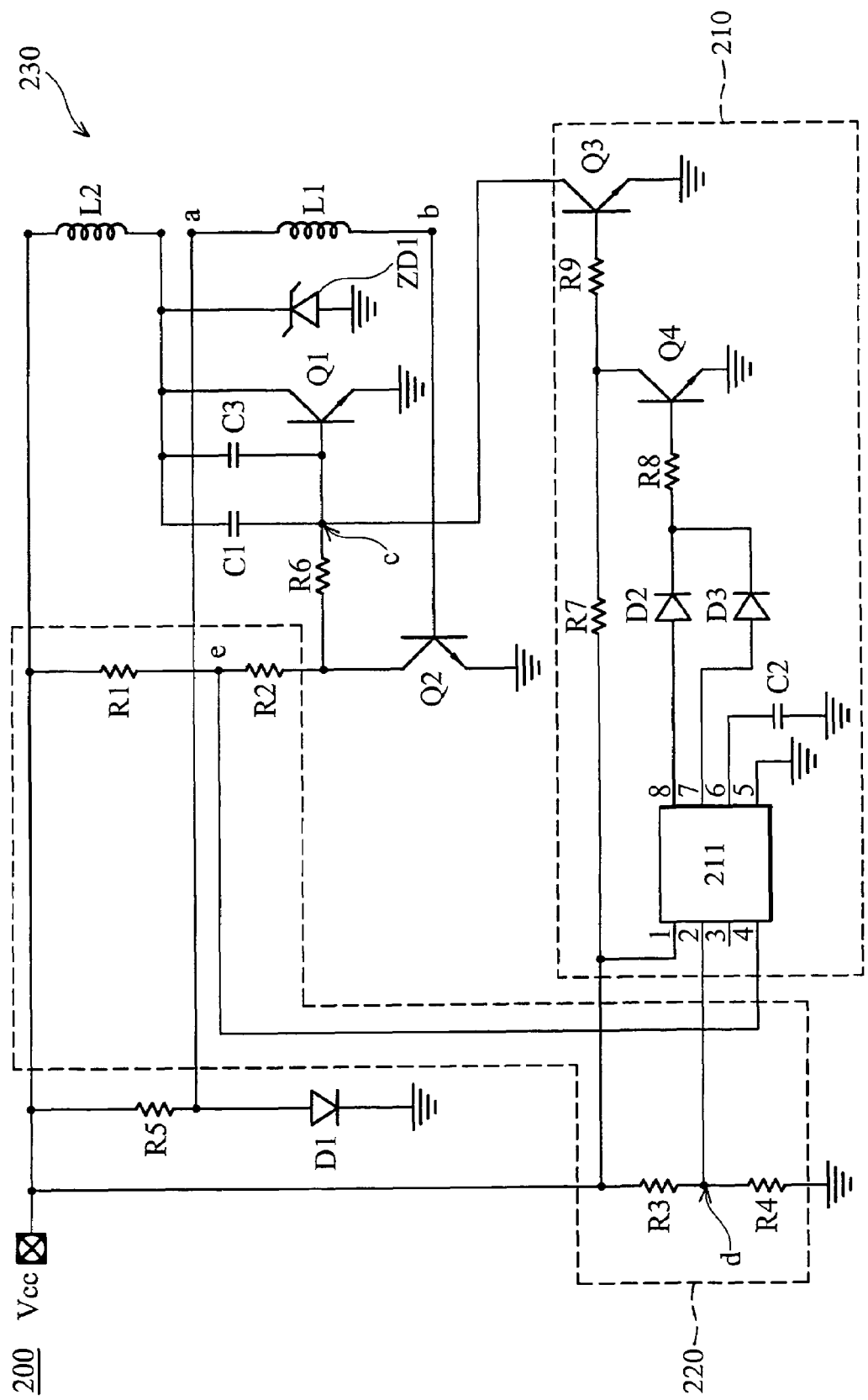
FIG. 3 is a circuit schematic diagram of a brushless DC motor drive apparatus without a Hall sensor, as another embodiment in the present invention.

A brushless DC motor drive apparatus according to the invention is now disclosed in detail. Referring to FIG. 3, which is a circuit schematic diagram of a brushless DC motor drive apparatus without a Hall sensor, as another embodiment in the present invention. In FIG. 3, the brushless DC motor drive apparatus 200 includes a drive circuit 230, a current shutdown and auto-restart circuit 210, and a DC voltage comparison circuit 220. The drive circuit 230 includes a first winding L1, a second winding L2, capacitors C1, C3, transistors. Q1, Q2, a diode D1; a Zener diode ZD1, and resistors R1, R2. The first winding L1 may be a supplementary winding, and the second winding L2 may be a power winding. Under normal operation, the motor rotor is driven to rotate by both windings which are subjected to a switching operation and alternated current directions of the drive circuit 230.

The current shutdown and auto-restart circuit 210 includes a drive integrated circuit (drive IC) 211, diodes D2, D3, transistors Q3, Q4, and a capacitor C2. The DC voltage comparison circuit 220 mainly includes resistors R1, R2, R3, R4. A constant voltage is maintained at node "d" between R3 and R4; whereas node "e" between R1 and R2 conveys a non-constant voltage varying with the switching operation and alternated current directions of the brushless DC motor drive apparatus 200.

The current shutdown and auto-restart circuit 210 is electrically connected to the drive circuit 230 by deploying node "c", and employing the second and fourth pins of the drive IC 211, to acquire voltages at nodes "d" and "e" for comparison. Depending on voltage at the node "e" is greater than the constant voltage at the node "d", square wave signals are output to the diodes D2 and D3 through the eighth and seventh pins correspondingly.

It should be understood that the diodes D2, D3, and the resistor R8 which are connected between the drive IC 211 and the transistor Q4 may be eliminated or replaced with other components with the exact arrangement subject to the model of the drive IC and user requirements.

Under normal operations, square wave signals are output from the eighth and seventh pins alternately, as there is a voltage difference between the node "d" and the node "e". Since the switching signals output from the eighth and seventh pins are complementary, the base of the transistor Q4 remains at a high voltage potential, resulting in continuously current across the transistor Q4. As the transistor Q4 conducts, current flows through the resistor R7 and the transistor Q4 to the ground, resulting in a low voltage potential at the base of the transistor Q3. Consequently, the transistor Q3 is switched off and the current shutdown and auto startup circuit 210 is inactive. The first winding L1 and the second winding L2 continue to magnetically drive the rotor of the motor, due to the switching operation and the alternated current directions of the brushless DC motor drive apparatus 200.

Once a constant voltage source generates current, a high voltage potential is established at node "a", and a relative low voltage potential is at node "b", across the ends of the first winding L1. The base of the transistor Q2 is thus at low voltage potential and is switched off. There is no current through the first winding L1.

The base of the transistor Q1 is at high voltage potential, and the transistor Q1 is conductive, such that current from the second winding L2 flows through the transistor Q1 to the ground. The second winding L2 therefore exerts control over a stator generating an induced magnetic field to rotate the rotor to a predetermined angle, such as rotating 90 degrees counterclockwise.

When the rotor rotates a predetermined angle, the first winding L1 detects the power status and produces a reverse signal (e.g., reverse voltage). At this point, the voltage potential at node "a" is low, the voltage potential at node "b" is relatively high. The positive voltage generates a high voltage potential at the base of the transistor Q2, which becomes conductive, whereby current passes through the resistor R2 and the transistor Q2 to the ground, creating low voltage potential at the base of the transistor Q1. This results in the transistor Q1 being switched off, such that no current is generated through the second winding L2. Concurrently, the induced magnetic field ceases, and the rotor continues rotating in the same direction.

If the fan is blocked by a foreign object such as an obstacle, the rotor may be stopped immediately, entering a pending state. Since there is no tangential magnetic field present, current direction at node "e" between the resistors R1 and R2 does not alternate, such that the eighth and seventh pins of the drive IC 211 output no square wave signals to the diode D2, D3. Meanwhile, the base of the transistor Q4 remains at the state of low voltage potential, and the transistor Q4 is switched off. The base of the transistor Q3 is at the state of high voltage potential, and the transistor Q3 is switched on. Current thus travels through the resistors R7, R9 and the transistor Q3 to the ground. The base of the transistor Q1 is now at the state of low voltage potential, and the transistor Q1 is off, whereby there is no current through the second winding L2. The current shutdown and auto-restart circuit 210 may accordingly detect the abnormal condition via the DC voltage comparison circuit 220, and shut off the power to the drive circuit 230. This may prohibit reduces likelihood of overheating and fire hazards to the second winding L2.

The drive IC 211 utilizes the capacitor C2 to charge and discharge electricity automatically. The eighth and seventh pins of the drive IC 211 may generate a high voltage periodically, to return the transistor Q4 to conductivity. Upon removal of the obstacle, the transistor Q3 is switched off, and the transistor Q1 is switched on. As the result, the drive circuit 230 resumes normal operation. If the blockage remains, the drive IC 211 generates the triggering signal periodically, whereby the current shutdown and auto-restart circuit 210 may shut off the power supply so as to protect the active components and the windings of the drive apparatus, which may be triggered automatically to rotate the motor back on operating state, when the obstacle is removed. The disclosed brushless DC motor drive apparatus 200 requires no shut down and restart of the power supply, enhancing convenience.

However, the disclosed brushless DC motor drive apparatus is not restricted to the above-mentioned embodiments, it may employ complementary metal oxide semiconductor (CMOS) devices rather than the switching transistors Q1, Q2, Q3, Q4. The number of the resistors and the capacitors is not limited, with modifications appropriate to use allowable. In addition, an output (O/P) node can be applied so as to provide identification of power status. For example, it may be electrically coupled to a display monitor (or a display screen) via the third pin of drive IC 211, so that the power operating status can be shown by the display monitor. Furthermore, deployment of the drive IC is not restricted to any specific model, and nodes are not bound to output square wave signals via the eighth pin or the seventh pin alternately, as long as the drive IC accomplishes the functionality of the embodiments as disclosed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brushless DC motor drive apparatus without a Hall sensor, for driving a rotor, comprising:
   a drive circuit for rotating the rotor, wherein the driving circuit has a first winding and a second winding, the first winding being a supplementary winding, and the second winding being a power winding;
   a current shutdown and auto-restart circuit coupled to the drive circuit; and
   a DC voltage comparison circuit coupled to the current shutdown and auto-restart circuit;
   wherein the current shutdown and auto-restart circuit detects blockage of the rotor via the DC voltage comparison circuit, and shuts off a power to the drive circuit accordingly.

2. The brushless DC motor drive apparatus without a Hall sensor of claim 1, wherein the current shutdown and auto-restart circuit does not affect the drive circuit when the rotor rotates normally, and the current shutdown and auto-restart circuit shuts off the power to the drive circuit when blockage of the rotor is detected via the DC voltage comparison circuit.

3. The brushless DC motor drive apparatus without a Hall sensor of claim 1, wherein the drive circuit has a first transistor and a second transistor, when the drive circuit is powered on and the second transistor is switched off, no current is generated through the first winding, the first transistor becomes conductive, and current is generated through the second winding and the first transistor to the ground such that a magnetic field is induced to drive the rotor to rotate at a predetermined angle, and, after the rotor is rotated, the first winding generates a voltage, the second transistor becomes conductive, the first transistor is switched off, and no current is generated through the second winding, whereby the rotor is driven to rotate by the first winding and the second winding, which are subjected to a switching operation and alternated current directions of the drive circuit.

4. The brushless DC motor drive apparatus without a Hall sensor of claim 3, wherein the first winding and the second winding are disposed by winding around the rotor for magnetically driving the rotor to rotate.

5. The brushless DC motor drive apparatus without a Hall sensor of claim 3, wherein the current shutdown and auto-restart circuit has a third transistor, no effect is imposed on the drive circuit when the third transistor is switched off, and the first transistor is switched off and no current is generated through the second winding when the third transistor is switched on, so as to shut off the power to the drive circuit.

6. The brushless DC motor drive apparatus without a Hall sensor of claim 5, wherein the current shutdown and auto-restart circuit has a fourth transistor and a drive IC, the drive IC outputs a signal to determine a switch on/off state of the fourth transistor, the third transistor is switched on and the drive circuit is shut off by the current shutdown and auto-restart circuit when the fourth transistor is switched off, and the third transistor is switched off and the current shutdown and auto-restart circuit does not work when the fourth transistor is switched on.

7. The brushless DC motor drive apparatus without a Hall sensor of claim 6, wherein the current shutdown and auto-restart circuit has a capacitor for providing a voltage to turn on the fourth transistor when the drive circuit is shut off, so as to switch off the third transistor and enable the drive circuit to drive the rotor.

8. The brushless DC motor drive apparatus without a Hall sensor of claim 6, wherein the current shutdown and auto-restart circuit has a diode electrically connected between the drive IC and the fourth transistor for adjusting the signal output from the drive IC.

9. The brushless DC motor drive apparatus without a Hall sensor of claim 1, wherein the drive circuit has a first complementary metal oxide semiconductor (CMOS) and a second CMOS, wherein, when the drive circuit is powered on and the second CMOS is switched off, no current is generated though the first winding, the first CMOS is conductive, and current is generated though the second winding and the first CMOS to the ground such that a magnetic field is induced to drive the rotor to rotate at a predetermined angle and, after the rotor is rotated, the first winding generates a voltage, the second CMOS is conductive, the first CMOS is off and there is no current through the second winding, whereby the rotor is driven to rotate by the first winding and the second winding, which are subjected to a switching operation and alternated current directions of the drive circuit.

10. The brushless DC motor drive apparatus without a Hall sensor of claim 9, wherein the first winding and the second winding are disposed by winding wound the rotor for magnetically driving the rotor to rotate.

11. The brushless DC motor drive apparatus without a Hall sensor of claim 9, wherein the current shutdown and auto-restart circuit has a third CMOS, wherein, when the third CMOS is switched off, no effect is imposed on the drive circuit, and when the third CMOS is switched on, the first CMOS is switched off and no current is generated through the second winding, so as to shut off the power to the drive circuit.

12. The brushless DC motor drive apparatus without a Hall sensor of claim 11, the current shutdown and auto-restart circuit having a fourth CMOS and a drive IC, wherein the drive IC outputs a signal to determine a switch on/off state of the fourth CMOS, the third CMOS is switched on and the drive circuit is shut off by the current shutdown and auto-restart circuit when the fourth CMOS is switched off, and the third CMOS is switched off and the current shutdown and auto-restart circuit does not work when the fourth CMOS is switched on.

13. The brushless DC motor drive apparatus without a Hall sensor of claim 12, wherein the current shutdown and auto-restart circuit has a capacitor for providing a voltage to turn on the fourth CMOS when the drive circuit is shut off, so as to switch off the third CMOS and enable the drive circuit to drive the rotor rotate.

14. The brushless DC motor drive apparatus without a Hall sensor of claim 12, wherein the current shutdown and auto-restart circuit has a diode electrically connected between the drive IC and the fourth CMOS for adjusting the signal output from the drive IC.

15. The brushless DC motor drive apparatus without a Hall sensor of claim 1, wherein the current shutdown and auto-restart circuit has a drive IC, wherein two voltages from the DC voltage comparison circuit are compared in the drive IC, and the drive IC outputs a signal to the drive circuit.

16. The brushless DC motor drive apparatus without a Hall sensor of claim 15, having an output node coupled to the drive IC and a display monitor, so that the operating information of the brushless DC motor drive apparatus is shown by the display monitor.

17. The brushless DC motor drive apparatus without a Hall sensor of claim 15, wherein the DC voltage comparison circuit has a first resistor, a second resistor, a third resistor and a fourth resistor, wherein the two voltages are respectively obtained between the first resistor and the second resistor, and between the third resistor and the fourth resistor.

18. The brushless DC motor drive apparatus without a Hall sensor of claim 17, wherein the voltage between the first resistor and the second resistor is affected by the first winding in the drive circuit, but the voltage between the third resistor and the fourth resistor is constant.

* * * * *